(12) United States Patent
Chu

(10) Patent No.: US 9,740,456 B2
(45) Date of Patent: Aug. 22, 2017

(54) CIRCUITRY AND METHODS FOR IMPLEMENTING GALOIS-FIELD REDUCTION

(71) Applicant: Altera Corporation, San Jose, CA (US)

(72) Inventor: Pohrong Rita Chu, Saratoga, CA (US)

(73) Assignee: Altera Corporation, San Jose, CA (US)

( * ) Notice: Subject to any disclaimer, the term of this patent is extended or adjusted under 35 U.S.C. 154(b) by 216 days.

(21) Appl. No.: 14/694,396

(22) Filed: Apr. 23, 2015

(65) Prior Publication Data
US 2016/0313978 A1    Oct. 27, 2016

(51) Int. Cl.
G06F 7/72 (2006.01)
(52) U.S. Cl.
CPC .................... *G06F 7/724* (2013.01)
(58) Field of Classification Search
None
See application file for complete search history.

(56) References Cited

U.S. PATENT DOCUMENTS

| | | | |
|---|---|---|---|
| 6,377,969 B1 * | 4/2002 | Orlando | G06F 7/724 380/28 |
| 9,619,207 B1 | 4/2017 | Langhammer | |
| 2001/0054053 A1 * | 12/2001 | Lambert | F01N 3/28 708/492 |
| 2003/0135530 A1 * | 7/2003 | Parthasarathy | G06F 7/724 708/492 |
| 2013/0007573 A1 * | 1/2013 | Radhakrishnan | G06F 11/1076 714/807 |
| 2016/0313978 A1 * | 10/2016 | Chu | G06F 7/724 |

FOREIGN PATENT DOCUMENTS

WO    WO 03/048918    6/2003

OTHER PUBLICATIONS

Altera Corporation "Stratix V Device Handbook," vol. 1: Device Interfaces and Integration, Ch. 3, pp. 3-1 to 3-28 Jan. 23, 2015.
Clarke, C.K.P., "Reed-Solomon Error Correction," *British Broadcasting Corporation Research & Development, White Paper WHP 031*, pp. 1-39, Jul. 2002.

* cited by examiner

*Primary Examiner* — David H Malzahn

(57) ABSTRACT

Galois-field reduction circuitry for reducing a Galois-field expansion value, using an irreducible polynomial, includes a plurality of memories, each for storing a respective value derived from the irreducible polynomial and a respective combination of expansion bit values, wherein expansion bits of the expansion value address the plurality of memories to output one or more of the respective values. The Galois-field reduction circuitry also includes exclusive-OR circuitry for combining output of the plurality of memories with in-field bits of said expansion value. There are also a method of operating such Galois-field reduction circuitry to reduce a Galois-field expansion value, a programmable integrated circuit device incorporating the circuitry, a method of performing a Galois-field multiplication operation on such a programmable integrated circuit device, and a method of configuring a programmable integrated circuit device to perform such a Galois-field multiplication operation.

10 Claims, 16 Drawing Sheets

| Address : Out-of-Field Bits [11:8] | Stored Values |
|---|---|
| {0000} | 0 |
| {0001} | 29 |
| {0010} | 58 |
| {0011} | 29^58 |
| {0100} | 116 |
| {0101} | 116^29 |
| {0110} | 116^58 |
| {0111} | 116^58^29 |
| {1000} | 232 |
| {1001} | 232^29 |
| {1010} | 232^58 |
| {1011} | 232^58^29 |
| {1100} | 232^116 |
| {1101} | 232^116^29 |
| {1110} | 232^116^58 |
| {1111} | 232^116^58^29 |

701

| Address : Out-of-Field Bits [14:12] | Stored Values |
|---|---|
| {0000} | 0 |
| {0001} | 205 |
| {0010} | 135 |
| {0011} | 205^135 |
| {0100} | 19 |
| {0101} | 19^205 |
| {0110} | 19^135 |
| {0111} | 19^135^205 |
| {1000} | x |
| {1001} | x |
| {1010} | x |
| {1011} | x |
| {1100} | x |
| {1101} | x |
| {1110} | x |
| {1111} | x |

CIRCUITRY AND METHODS FOR IMPLEMENTING GALOIS-FIELD REDUCTION

FIELD OF THE INVENTION

This invention relates to circuitry for implementing Galois-field reduction, and methods of using that circuitry to implement Galois-field reductions of arbitrary size, especially a programmable integrated circuit device.

BACKGROUND OF THE INVENTION

Finite-field, or Galois-field, arithmetic has the property that the result of any operation on two values within a particular finite field also falls within the field. It should be apparent that for many operations on values a finite field, that property would be easy to achieve, but for other operations, that property could become difficult to achieve. As a trivial illustration, for example, if the operation is addition, ordinary addition of values in the lower ranges of the finite field would provide a result that is still within the field, but if one of the values being operated on is the highest value in the field, then there is no ordinary addition operation that would provide a result that is still within the field (assuming all values in the field are positive).

Therefore, as is well-known, Galois-field operations, particularly when implemented in circuitry, include two stages—an expansion stage, which may result in a value outside the field, and a reduction stage, which brings that value back into the field. Building a circuit to perform Galois-field reduction is straightforward when the sizes of the field and of the operation are known. However, there are situations, particularly when designing Galois-field operations circuitry for a programmable integrated circuit device—e.g., a field-programmable gate array (FPGA), that the sizes of the field and of the operation are unknown and arbitrary, as they depend on future user needs.

SUMMARY OF THE INVENTION

In accordance with embodiments of the present invention, circuitry may be added to an integrated circuit device to facilitate Galois-field reduction operations. Although the circuitry may have a fixed size, the ability to cascade multiple blocks of circuitry allows Galois-field reductions of arbitrary depth to be performed.

Therefore, in accordance with embodiments of the present invention there is provided Galois-field reduction circuitry for reducing a Galois-field expansion value using an irreducible polynomial. The Galois-field reduction circuitry includes a plurality of memories, each for storing a respective value derived from the irreducible polynomial and a respective expansion bit position. Gates select ones of said the plurality of memories corresponding to ones of the respective expansion bit positions that contain '1', and an exclusive-OR gate combines outputs of the gates that select.

A method of operating Galois-field reduction circuitry to reduce a Galois-field expansion value using an irreducible polynomial is provided, where the Galois-field reduction circuitry includes a plurality of memories, gates that select ones of the plurality of memories, and an exclusive-OR gate for combining outputs of the gates that select. The method includes, for each respective expansion bit position in the Galois-field expansion, deriving a respective value from the respective expansion bit position and the irreducible polynomial, storing each of the respective values in a respective one of the plurality of memories, using ones of the gates corresponding to ones of the respective expansion bit positions that contain '1', selecting corresponding ones of the plurality of memories, and combining the respective values stored in the respective ones of the plurality of memories.

There is also provided a specialized processing block for a programmable integrated circuit device. The specialized processing block includes a multiplier stage, an input stage upstream of the multiplier stage, the input stage including register file circuitry, the register file circuitry including a plurality of memories, gates that select ones of the plurality of memories, an OR-gate for combining outputs of the gates that select, an exclusive-OR gate for combining outputs of the gates that select, and a register file output that selects between an output of the OR-gate and an output of said exclusive-OR gate, and is selectably connectable to the multiplier stage and selectably connectable to an output of the specialized processing block.

There is further provided a programmable integrated circuit device including a plurality of such specialized processing blocks, an additional multiplier and additional exclusive-OR gates, wherein inputs of the additional exclusive-OR gates are selectably connectable to ranges of an output of the additional multiplier, each of the ranges having a bit width equal to the number of bits, and are selectably connectable to register file outputs of the plurality of specialized processing blocks.

A method is provided to perform a Galois-field multiplication operation of two m-bit numbers using an irreducible polynomial, on such a programmable integrated circuit device. The method includes providing a plurality of cascaded chains of a plurality instances of the specialized processing block, where each memory in the plurality of memories has a width of a number of bits, and the plurality of memories includes a number of memories at least equal to the number of bits, m being a multiple of the number of bits, the plurality of cascaded chains being equal in number to the multiple, and said plurality of instances of the specialized processing blocks being equal in number to said multiple. For each respective one of m−1 Galois-field expansion bit positions, a respective value is derived by performing a respective exclusive-OR of the respective expansion bit position and the irreducible polynomial and the respective value is stored across corresponding respective memories in one of the cascaded chains. A multiplication operation is performed on the two m-bit numbers to yield a (2m−1)-bit Galois-field expansion result. m base bits of the Galois-field expansion result are partitioned into a plurality of segments equal in number to the multiple. For each of m−1 expansion bits of the Galois-field expansion result that contains a '1', an exclusive-OR operation is performed across a corresponding row of memories in one of the cascaded chains. For each respective one of the cascaded chains, a further exclusive-OR operation of a respective one of the segments with results of the exclusive-OR operations across the corresponding rows of memories is performed. Results of the further exclusive-OR operations are concatenated.

There also is provided a method of configuring such a programmable integrated circuit device to perform such a Galois-field operation. A plurality of cascaded chains of a plurality instances of the specialized processing block are configured, the plurality of cascaded chains being equal in number to a multiple of the width, and the plurality of instances of the specialized processing blocks being equal in number to the multiple of said width. Logic is configured in the programmable integrated circuit device to derive, for each respective one of m−1 Galois-field expansion bit positions, a respective value by performing a respective exclusive-OR of the respective expansion bit position and the irreducible polynomial where m is the multiple of the width, and logic is configured in the programmable integrated circuit device to store the respective value across corresponding respective memories in one of the cascaded chains. Logic is configured in the programmable integrated circuit device to perform a multiplication operation on the two m-bit numbers to yield a 2m−1 bit Galois-field expansion result. Logic is configured in the programmable integrated circuit device to partition m base bits of the Galois-field expansion result into a plurality of segments equal in number to the multiple. Logic is configured in the programmable integrated circuit device to perform, for each of m−1 expansion bits of the Galois-field expansion result that contains a '1', an exclusive-OR operation across a corresponding row of memories in one of the cascaded chains. Logic is configured in the programmable integrated circuit device to perform, for each respective one of the cascaded chains, a further exclusive-OR operation of a respective one of the segments with results of the exclusive-OR operations across the corresponding rows of memories. Logic is configured in the programmable integrated circuit device to concatenate results of the further exclusive-OR operations.

There also is provided Galois-field reduction circuitry for reducing a Galois-field expansion value using an irreducible polynomial, where the Galois-field reduction circuitry includes a plurality of memories, each for storing a respective value derived from the irreducible polynomial and a respective combination of expansion bit values, wherein expansion bits of the expansion value address the plurality of memories to output one or more of the respective values. The Galois-field reduction circuitry also includes exclusive-OR circuitry for combining output of the plurality of memories with in-field bits of said expansion value.

There also is provided a method of operating Galois-field reduction circuitry to reduce a Galois-field expansion value using an irreducible polynomial, where the Galois-field reduction circuitry includes a plurality of memories, and exclusive-OR circuitry for combining output of the plurality of memories with in-field bits of the expansion value. The method includes, for each respective expansion bit position in the Galois-field expansion value, deriving a respective value from the respective expansion bit position and the irreducible polynomial. The method further includes, for different possible combinations of bits in the expansion bit positions, combining ones of the respective values to yield respective combined values. The method also includes storing each respective combined value in a respective one of the plurality of memories, using values of the expansion bit positions to address the plurality of memories and select corresponding one or more of the combined values, and operating on the select corresponding one or more of the combined values and the in-field bits to determine a reduced Galois-field value.

There is further provided a programmable integrated circuit device including a plurality of specialized processing blocks, each of the specialized processing blocks having a multiplier stage including an adder having carry circuitry and AND-gate circuitry for selectably deactivating the carry circuitry. An input stage is upstream of the multiplier stage, with the input stage including a plurality of memories addressable by inputs of the specialized processing block. The block also has exclusive-OR circuitry for combining output of the plurality of memories with other inputs of the specialized processing block, and a cascade connection from an output of the multiplier stage to another of the specialized processing blocks.

A method of performing a Galois-field multiplication operation on two m-bit numbers using an irreducible polynomial on such a programmable integrated circuit device, as well as a method of configuring a programmable integrated circuit device to perform such a Galois-field multiplication operation, also are provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 8 shows examples of coefficient tables used in an embodiment of the present invention;

DETAILED DESCRIPTION OF THE INVENTION

Figure 1:
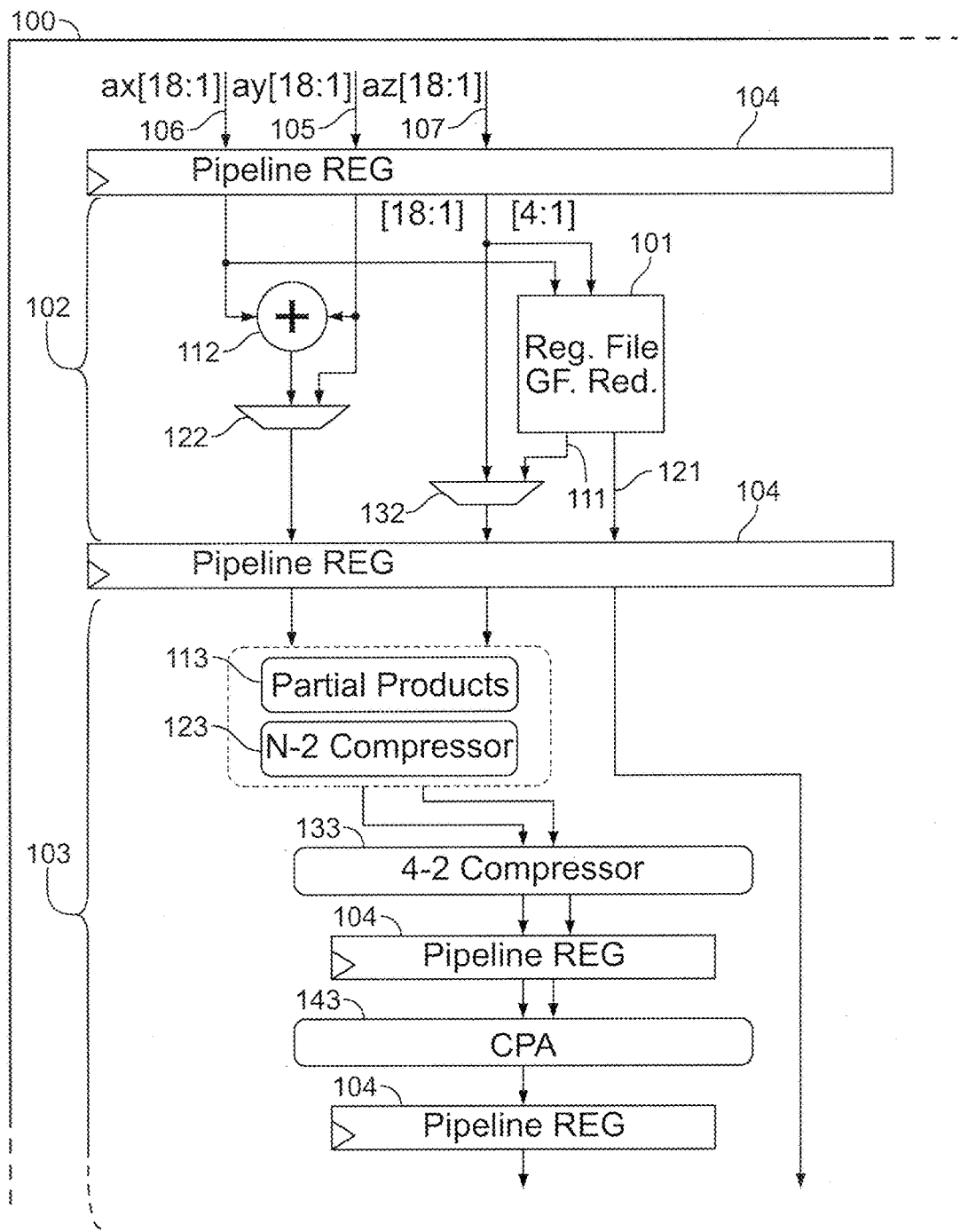
FIG. 1 shows an example of a portion of a specialized processing block of a programmable integrated circuit device, adapted according to embodiments of the present invention to facilitate Galois-field reduction operations.

As noted above, Galois-field arithmetic has the property that the result of any operation on two values within a particular finite field also falls within the field. The discussion that follows will use the illustration of Galois-field multiplication in a $GF(2^m)$ field—i.e., a field of m-bit binary numbers. For example, in digital electronics, it is common to operate on 8-bit binary numbers representing $0_{10}$-$255_{10}$. m is referred to as the "degree" of the Galois field. The elements in a Galois field are generated using a chosen "generator polynomial" $p(\alpha)$ of degree m. a may be referred to as a "root" or "base" of the polynomial. The polynomial must be irreducible—i.e. having no factors. For example:

For $GF(16)=GF(2^4), p(\alpha)=\alpha^4+\alpha+1$

For $GF(256)=GF(2^8), p(\alpha)=\alpha^8+\alpha^4+\alpha^3+\alpha^2+1$

For the $GF(2^4)$ case, the elements of the field are:

| Index form | Polynomial form | Binary form |
|---|---|---|
| 0 | 0 | 0000 |
| $\alpha^0$ | 1 | 0001 |
| $\alpha^1$ | $\alpha^1$ | 0010 |
| $\alpha^2$ | $\alpha^2$ | 0100 |
| $\alpha^3$ | $\alpha^3$ | 1000 |
| $\alpha^4$ | $\alpha^1+1$ | 0011 |
| $\alpha^5$ | $\alpha^2+\alpha$ | 0110 |
| $\alpha^6$ | $\alpha^3+\alpha^2$ | 1100 |
| $\alpha^7$ | $\alpha^3+\alpha+1$ | 1011 |
| $\alpha^8$ | $\alpha^2+1$ | 0101 |
| $\alpha^9$ | $\alpha^3+\alpha$ | 1010 |
| $\alpha^{10}$ | $\alpha^2+\alpha+1$ | 0111 |
| $\alpha^{11}$ | $\alpha^3+\alpha^2+\alpha$ | 1110 |
| $\alpha^{12}$ | $\alpha^3+\alpha^2+\alpha+1$ | 1111 |
| $\alpha^{13}$ | $\alpha^3+\alpha^2+1$ | 1101 |
| $\alpha^{14}$ | $\alpha^3+1$ | 1001 |

Similarly, for the $GF(2^8)$ case, the elements of the field are:

| Index form | Polynomial form | Binary form |
|---|---|---|
| 0 | 0 | 00000000 |
| $\alpha^0$ | 1 | 00000001 |
| $\alpha^1$ | $\alpha^1$ | 00000010 |
| $\alpha^2$ | $\alpha^2$ | 00000100 |
| $\alpha^3$ | $\alpha^3$ | 00001000 |
| $\alpha^4$ | $\alpha^4$ | 00010000 |
| $\alpha^5$ | $\alpha^5$ | 00100000 |
| $\alpha^6$ | $\alpha^6$ | 01000000 |
| $\alpha^7$ | $\alpha^7$ | 10000000 |
| $\alpha^8$ | $\alpha^4+\alpha^3+\alpha^2+1$ | 00011101 |
| $\alpha^9$ | $\alpha^5+\alpha^4+\alpha^3+\alpha$ | 00111010 |
| $\alpha^{10}$ | $\alpha^6+\alpha^5+\alpha^4+\alpha^2$ | 01110100 |
| $\alpha^{11}$ | $\alpha^7+\alpha^6+\alpha^5+\alpha^3$ | 11101000 |
| $\alpha^{12}$ | $\alpha^7+\alpha^6+\alpha^3+\alpha^2+1$ | 11001101 |
| $\alpha^{13}$ | $\alpha^7+\alpha^2+\alpha+1$ | 10000111 |
| $\alpha^{14}$ | $\alpha^4+\alpha+1$ | 00010011 |
| ... | ... | ... |
| $\alpha^{254}$ | $\alpha^7+\alpha^3+\alpha^2+\alpha$ | 10001110 |

As noted, by definition, all Galois-field operations must result in an element within the field. Galois-field operations include addition (XOR without carry), subtraction (XOR without borrow, which is essentially the same as addition), multiplication (AND and XOR without carry), and division (which is performed using a combination of multiplication, subtraction and shifting). Addition (or subtraction) of smaller values within the field would stay within the field without additional operations. However, for addition at the higher end of the field, or for any operation involving multiplication, additional operations are needed to keep the result within the field.

As noted in part above, one known method for Galois-field multiplication in a $GF(2^m)$ field is expansion of the $GF(2^m)$ multiplication, and reduction of the field back to the base $GF(2^m)$ field using the irreducible polynomial. Two m-bit numbers, when multiplied, would generate a (2m−1)-bit expanded value, which would be reduced back to an m-bit value. In an example shown below, m=8, the two inputs are $01100101_2$ (i.e., $101_{10}$) and $10010000_2$ (i.e., $144_{10}$), and the irreducible polynomial is $\alpha^8+\alpha^4+\alpha^3+\alpha^2+1$ (i.e., $100011101_2$, or $285_{10}$).

The following table shows the expansion of $01100101_2 \times 10010000_2$:

| | | | | | | | | | | | | |
|---|---|---|---|---|---|---|---|---|---|---|---|---|
| | | | | | 0 | 0 | 0 | 0 | 0 | 0 | 0 | 0 |
| | | | | 0 | 0 | 0 | 0 | 0 | 0 | 0 | 0 | |
| | | | 0 | 0 | 0 | 0 | 0 | 0 | 0 | 0 | | |
| | | 0 | 0 | 0 | 0 | 0 | 0 | 0 | 0 | | | |
| | | 0 | 1 | 1 | 0 | 0 | 1 | 0 | 1 | | | |
| | 0 | 0 | 0 | 0 | 0 | 0 | 0 | 0 | | | | |
| 0 | 0 | 0 | 0 | 0 | 0 | 0 | 0 | | | | | |
| 0 | 1 | 1 | 0 | 0 | 1 | 0 | 1 | | | | | |
| 0 | 1 | 1 | 0 | 1 | 0 | 0 | 1 | 1 | 0 | 1 | 0 | 0 | 0 | 0 |

The result—$0110100110100000_2$, or $13250_{10}$, is well outside the $2^8$ (i.e., 0-$255_{10}$) range of the finite field.

One known way of reducing this expansion result back to the finite field is perform a bit-by-bit exclusive-OR (XOR) operation, XORing the remaining value with the irreducible polynomial wherever a '1' occurs in the most-significant bit of the value beyond the field size. Thus, in our example:

| | | | | | | | | | | | | | |
|---|---|---|---|---|---|---|---|---|---|---|---|---|---|
| | 1 | 1 | 0 | 1 | 0 | 0 | 1 | 1 | 0 | 1 | 0 | 0 | 0 | 0 |
| XOR | 1 | 0 | 0 | 0 | 1 | 1 | 1 | 0 | 1 | | | | | |
| = | | 1 | 0 | 1 | 1 | 1 | 0 | 1 | 1 | 1 | 0 | 0 | 0 | 0 |
| XOR | | 1 | 0 | 0 | 0 | 1 | 1 | 1 | 0 | 1 | | | | |
| = | | | | 1 | 1 | 0 | 1 | 0 | 1 | 0 | 0 | 0 | 0 | 0 |
| XOR | | | | 1 | 0 | 0 | 0 | 1 | 1 | 1 | 0 | 1 | | |
| = | | | | | 1 | 0 | 1 | 1 | 1 | 0 | 1 | 0 | 0 | 0 |
| XOR | | | | | 1 | 0 | 0 | 0 | 1 | 1 | 1 | 0 | 1 | |
| = | | | | | | 0 | 1 | 1 | 1 | 0 | 1 | 1 | 1 | 0 | which yields the result $11101110_2$ (i.e., $238_{10}$).

However, the foregoing reduction technique is not easily generalized to an arbitrary Galois-field operation. An alternate technique according to embodiments of the invention is to calculate a value in the field for any position outside the field, by XORing that bit position with the irreducible polynomial. Although these values will differ from implementation to implementation depending on the polynomial, for any particular implementation, the values can be precalculated and stored in embodiments of circuitry according to the invention. For the GF(2) polynomial of our example, the decimal values of ascending '1's greater than the field (i.e., the ninth through fifteenth positions) are 29, 58, 116, 232, 205, 135, and 19, respectively. For any particular multiplication using that polynomial, the portion of the expansion within the field may be XORed with the stored value for any position outside the field that contains a '1'. All of the necessary XOR operations can be applied in parallel, and all the XOR operations remain within the m-bit field width. The results of these XOR operations are themselves XORed to obtain the final result:

|     |     |     |   | 1 | 1 | 0 | 1 | 0 | 0 | 1 | 1 | 0 | 1 | 0 | 0 | 0 | 0 |
| --- | --- | --- | --- | --- | --- | --- | --- | --- | --- | --- | --- | --- | --- | --- | --- | --- | --- |
| XOR |     |     | 116 |   |   |   |   | 0 | 1 | 1 | 1 | 0 | 1 | 0 | 0 |   |   |
| XOR |     | 205 |     |   |   |   |   |   |   | 1 | 1 | 0 | 0 | 1 | 1 | 0 | 1 |
| XOR | 135 |     |     |   |   |   |   |   |   | 1 | 0 | 0 | 0 | 0 | 1 | 1 | 1 |
| =   |     |     |     |   |   |   |   |   |   | 1 | 1 | 1 | 0 | 1 | 1 | 1 | 0 |

That is, the binary equivalents of $116_{10}$, $205_{10}$ and $135_{10}$ are separately XORed with $11010000_2$, yielding $01110100_2$, $11001101_2$, and $10000111_2$, which are themselves XORed to yield $11101110_2$ (i.e., $238_{10}$), which is the same result obtained above using the traditional technique.

The expansion produces 2m−1 bits, with m−1 bits outside the field. The m−1 precalculated values (in this example, $\{29_{10}, 58_{10}, 116_{10}, 232_{10}, 205_{10}, 135_{10}, 19_{10}\}$) can be loaded into a register file, such as that described below) in locations 0 through 6. The upper m−1 bits of the expanded field (bits 2m−1 to m+1)—i.e., 7 bits in this example—would be used to select the register file locations to be XORed together, the result of which would then be XORed with the lower m bits (8 bits in this example) of the expansion result.

The circuitry to be used for the register file could be provided in its own dedicated blocks on the integrated circuit device. However, because the register file may have other uses, and to conserve die space, the register file circuitry also may be included as part of another specialized processing block on the device. For example, FIG. 1 shows the inclusion of the register file circuitry 101 in a digital signal processing (DSP) block.

More specifically, FIG. 1 shows a simplified rendering of a portion of a DSP block 100 provided in the STRATIX® family of FPGAs from Altera Corporation, of San Jose, Calif., to which register file circuitry 101 has been added. Such a DSP Block has at least an input stage 102 and a multiplier stage 103, plus additional stages (not shown). The stages may be pipelined, and pipeline registers 104 are shown before each stage 102, 103 (as well as within stage 103). Input stage 102 as shown includes a pre-adder 112 (which may be bypassed under control of multiplexer 122), and register file circuitry 101 which may be bypassed under control of multiplexer 132). The multiplier stage 103 of DSP block 100 may contain two 19×18 multipliers, which can be combined to make one 28×27 multiplier. In FIG. 1, the components of one multiplier, including partial product generator 113, compressors 123, 133, and carry-propagate adder 143, are shown in multiplier stage 103. Note that compressor 133, and carry-propagate adder 143 may be shared with a second partial product generator (not shown) to provide a combined output of two multiplication operations.

One input of each multiplier can be a block input 105 or the output of a pre-adder 112 (which can, e.g., add two of 18-bit inputs 105, 106 to improve support for symmetrical finite-impulse-response—i.e., FIR—filters). The other input for each multiplier can come from a DSP Block input 107, or a coefficient table stored in register file circuitry 101. In this example, the lower 4 bits of block input 107 are selected as the coefficient table entries. The depth of the coefficient table would depend on the number of registers in register file circuitry 101. Thus, if there were four or eight registers, the depth would be 16 or 256.

As for width, each register may be 18 bits wide, providing an 18-bit-wide register file. However, as noted above, there are two multipliers, and therefore there is a second register file (not shown), and the two register files may be operated together as a single 36-bit-wide file.

Register file circuitry 101 has an output 111 that can be input into multiplier stage 103 (e.g., when register file circuitry 101 is used to store FIR filter coefficients), and a separate Galois-field reduction output 121. The generation of those outputs may be understood by reference to FIG. 2 which shows details of register file circuitry 101.

Figure 2:
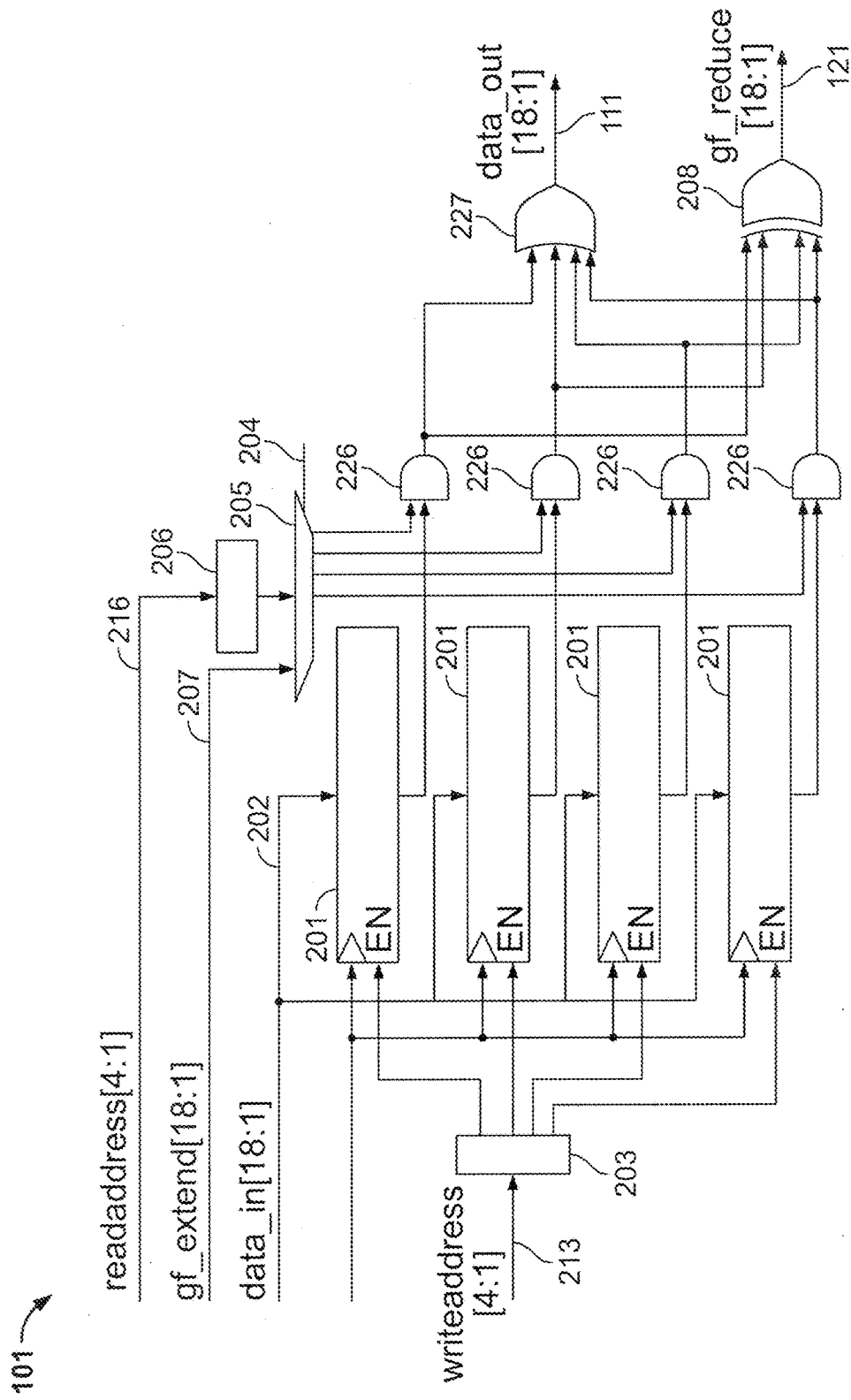
FIG. 2 shows a register file structure in accordance with embodiments of this invention for incorporation into the structure of FIG. 1.

In the implementation shown in FIG. 2, register file circuitry 101 includes four registers 201. In this implementation, each register 201 is 18 bits wide, but other widths are possible. Similarly, the number of registers 201 is four, but other numbers of registers 201 (e.g., eight, as discussed above) may be provided. Registers 201 may loaded with data (which are 18 bits wide in this example), via input 202, under the control of write address decoder 203, which decodes write address 213 (which is four bits wide in this example).

For reading, register file circuitry may operate in a "normal" (i.e., non-GF-reduction) mode (e.g., when used as a FIR filter coefficient table as described above) or in a GF-reduction mode. In the normal mode, control signal 204 causes multiplexer 205 to select the output of read address decoder 206 which decodes read address 216. The resulting bits are used to turn on the appropriate one of AND-gates 226. The outputs of AND-gates 226 will be one-hot (or "n-hot", where n is the width of register 201)—i.e., only one of AND-gates 226 will be non-zero. Those outputs of AND-gates 226 are then ORed at OR-gate 227 to read out the contents of the desired one of registers 201.

In GF-reduction mode, each register 201 is loaded with one of the m−1 precalculated values described above. Control signal 204 causes multiplexer 205 to select GF-extend input 207 which is the upper m−1 bits of the expansion result. As drawn, this signal can accommodate up to 18 expansion bits, but other signal widths may be provided. This signal activates the appropriate ones of AND-gates 226 to select the desired ones of the m−1 precalculated values, which are XORed at XOR-gate 208 to provide Galois-field reduction output 121 (depending on how many of the precalculated values are selected, this may take multiple XOR steps to reduce the result to the finite field), which is then XORed separately (see below) with the lower m bits of the expansion result.

If registers 201 have a certain width (e.g., 18 bits), that limits the size of a Galois-field reduction that can be performed using a single specialized processing block (e.g., DSP block). However, different applications may have different requirements. For example, most Reed-Solomon decoder applications use 8- to 12-bit fields. Many BCH applications (such as Flash SSD servers) use 12-14 bit fields. Those applications would fit within a single block. However, other applications need larger fields. For example, Advanced Encryption Standard-Galois/Counter Mode (AES-GCM) encryption/authentication needs 128 bits and many elliptic curve cryptography (ECC) applications will need fields that are 160-233 bits wide, or even wider.

Figure 3:
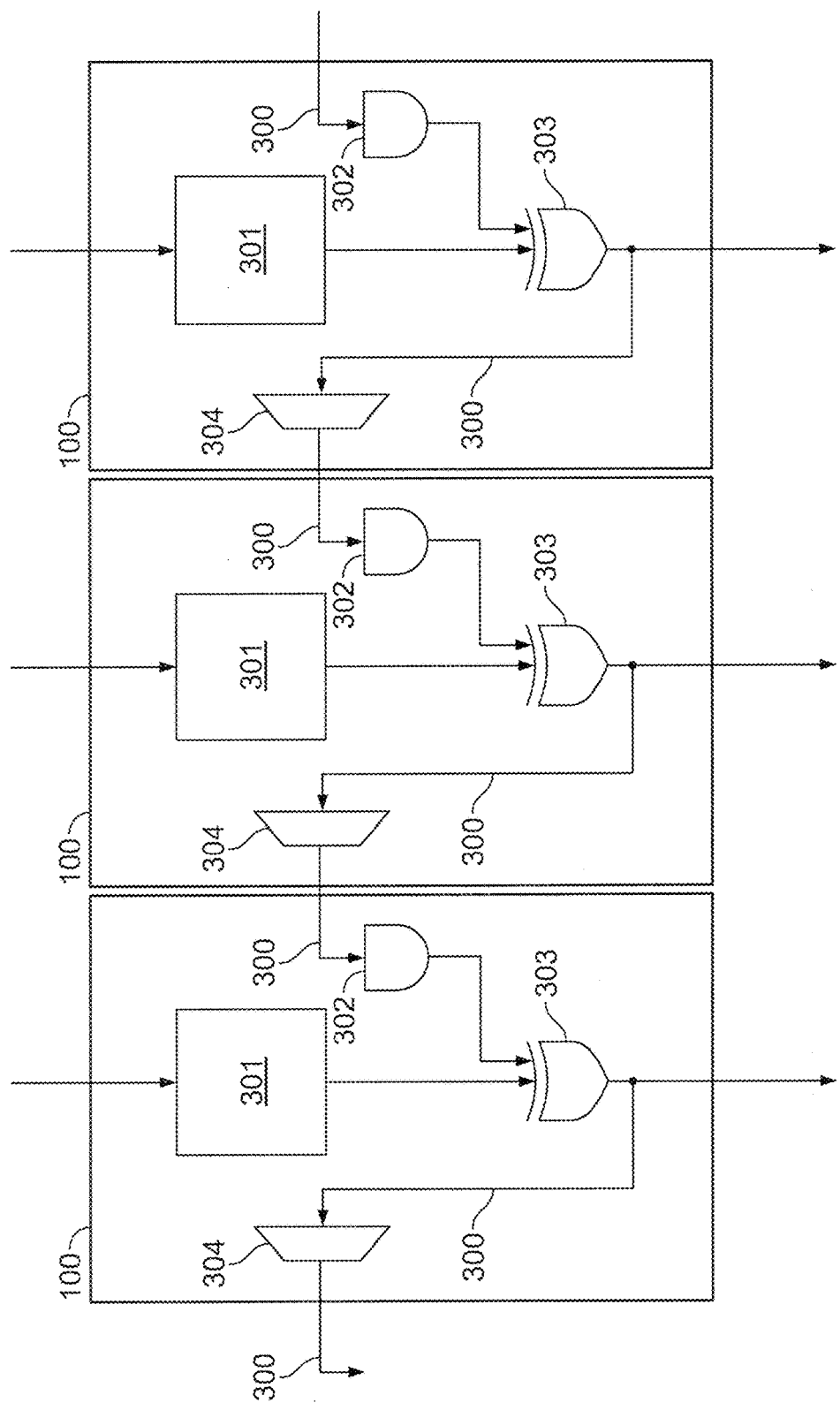
FIG. 3 shows how blocks including Galois-field reduction circuitry according to embodiments of the invention may be cascaded to perform deeper Galois-field reduction operations.

Therefore, in accordance with another aspect of the present invention, Galois-field reduction circuitry as described above may be cascaded together to provide deeper register files. FIG. 3 shows three DSP blocks 100 of the type described above in a schematic representation in which only the elements necessary for understanding of cascaded Galois-field reduction operations are shown. Thus, register files 301 correspond to registers 201 above. XOR-gate 303 corresponds to XOR-gate 208 above.

Cascade connections 300 correspond to known cascade connections such as those between the aforementioned DSP blocks in the aforementioned STRATIX® family of FPGAs from Altera Corporation. AND-gates 302 and multiplexers 304 assure that the correct signals are cascaded. Specifically, cascade connections can be use to cascade any number of different signals in blocks 100 depending on the user logic design with which the FPGA is configured. When cascading Galois-field reduction circuitry, it is desired that the output of one of XOR-gates 208/303 be routed as an input to a subsequent one of XOR-gates 208/303. On the output side, multiplexer 304 is used to select the output of XOR-gate 303 in a current block 100 as the signal (among the many cascadable signals in block 100) to be output on the current block's cascade output. And on the input side, AND-gate 302 only connects the current block's cascade input to XOR-gate 303 when the output of XOR-gate 303 of a neighboring block 100 is the signal that has been input on the current block's cascade input (as opposed to a signal intended for some other portion of the current block).

Figure 4:
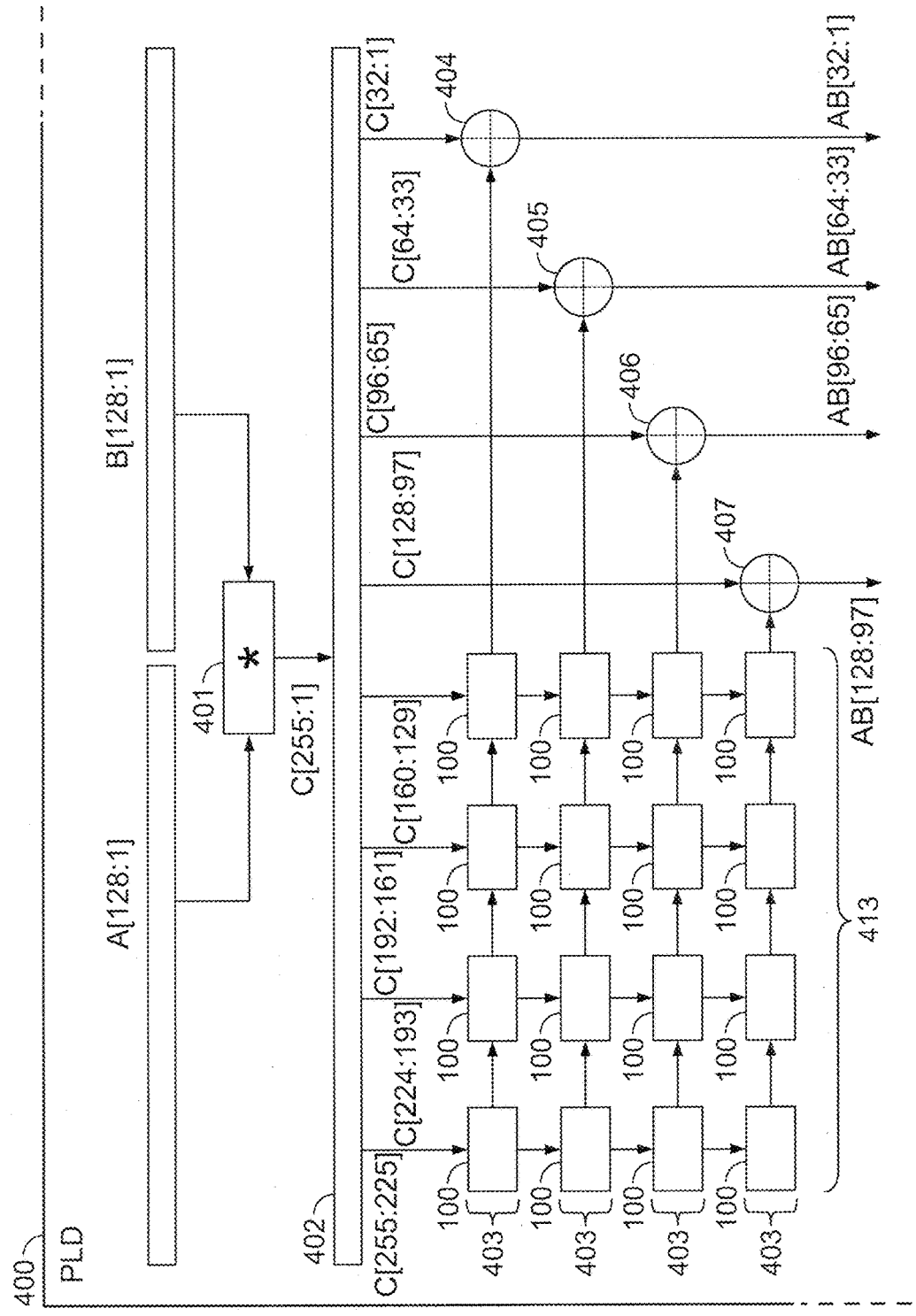
FIG. 4 shows how blocks including Galois-field reduction circuitry according to embodiments of the invention may be further cascaded in two dimensions to perform wider and deeper Galois-field reduction operations.

While the arrangement of FIG. 3 allows blocks 100 to be cascaded to increase the Galois-field reduction depth, FIG. 4 shows how blocks 100 may be cascaded to increase the Galois-field reduction width. Increasing both dimensions may be required, because generally Galois-field reduction of a (2m−1)-bit expansion requires an m×(m−1) matrix.

In FIG. 4, each of the two numbers A and B being multiplied at 401 is 128 bits wide, yielding a 255-bit-wide expansion 402 having 128 base bits [128:1] and 127 expansion bits [255:129]. If each DSP block 100 can handle 32 bits as discussed above, then each cascaded row 403 of four DSP blocks 100 (arranged similarly to the three-block cascade of FIG. 3, except from left-to-right rather than right-to-left) increases the depth of the reduction matrix to 128. To handle the increased width, four such cascaded rows 403 are provided to form a matrix 413 of DSP blocks 100, and each row 403 is XORed (at 404, 405, 406 and 407) with a separate 32-bit range of the base bits [128:1], and the four XOR results are concatenated to provide the reduced product. The values of the expansion bits are passed through from one row 403 to the next row 403, so that in each row 403, corresponding DSP blocks have the same expansion bit inputs.

In this implementation, multiplier 401, as well as XOR-gates 404, 405, 406 and 407, may be provided externally to the integrated circuit device, may be provided separately on the integrated circuit device, may be configured from existing multipliers on the device such as those in additional ones of DSP block 100, or may be configured from general-purpose programmable logic on the device (assuming the device is a programmable device such as an FPGA). As shown here, the device is an FPGA 400.

Figure 5:
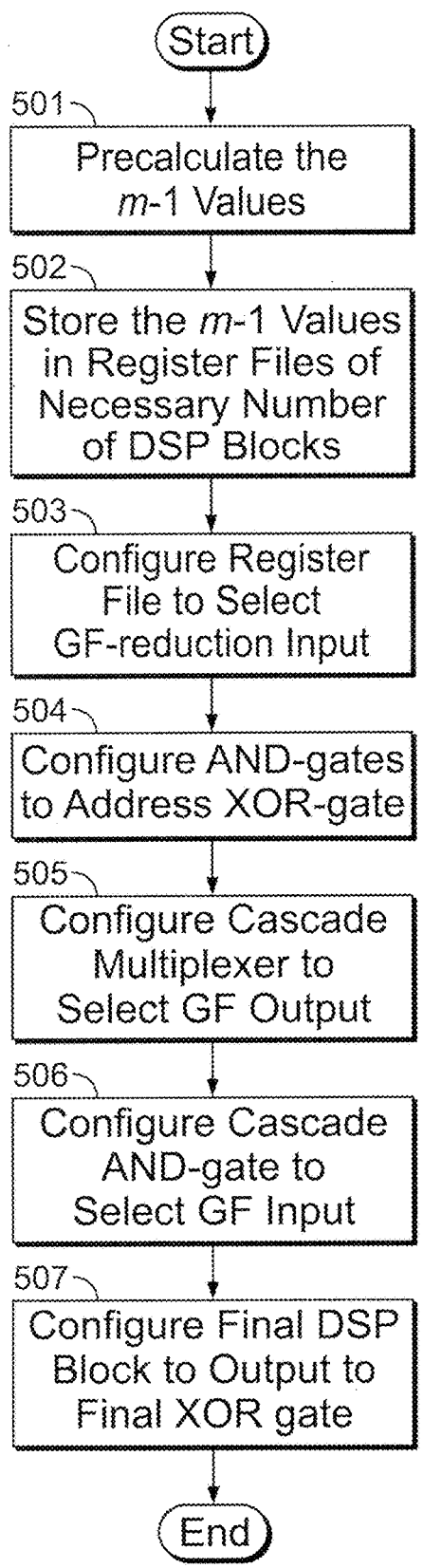
FIG. 5 is a flow diagram of a method according to an embodiment of the present invention for configuring a programmable integrated circuit device incorporating the present invention to perform Galois-field reduction.

A programmable device such as FPGA 400 provided with register file circuitry 101 in DSP blocks 100, as described above, may be configured to perform Galois-field reduction operations for a predetermined value of m and particular irreducible polynomial, as follows (see FIG. 5):

Once m and the irreducible polynomial are known, the m−1 precalculated values described above may be calculated (as at 501), and stored (as at 502) in appropriate ones of registers 201 in a suitable number of DSP blocks 100. Generally, a matrix of n×n DSP blocks 100, where n=ceil (m/w) and w is the width each register 201, will be used. Each DSP block 100 in the matrix is configured for Galois-field reduction operation by configuring control signal 204 (as at 503) to cause multiplexer 205 to select GF-extend input 207, and configuring AND-gates 226 in each DSP block 100 (as at 504) to select as many of registers 201 as may be appropriate be input to the XOR-gate 208 of that DSP block 100 (rather than selecting, in one-hot fashion as in the non-GF-reduction mode, a single register 201 to be input to OR-gate 227). In addition, each row 403 of DSP blocks 100 is cascaded by setting, in each but the last of DSP blocks 100 in a row 403, multiplexer 304 to select, as its input, Galois-field reduction output 121 (as at 505), and by setting, in each but the first of DSP blocks 100 in a row 403, AND-gate 302 to select, as an input to XOR-gate 208 of that block 100, Galois-field reduction output 121 cascaded from a previous block 100 (as at 506). Finally, as at 507, Galois-field reduction output 121 of the last DSP block 100 in each row 403 is configured to be input to one of XOR-gates 404, 405, 406, 407, etc. (as many XOR-gates as there are rows 403).

Figure 6:
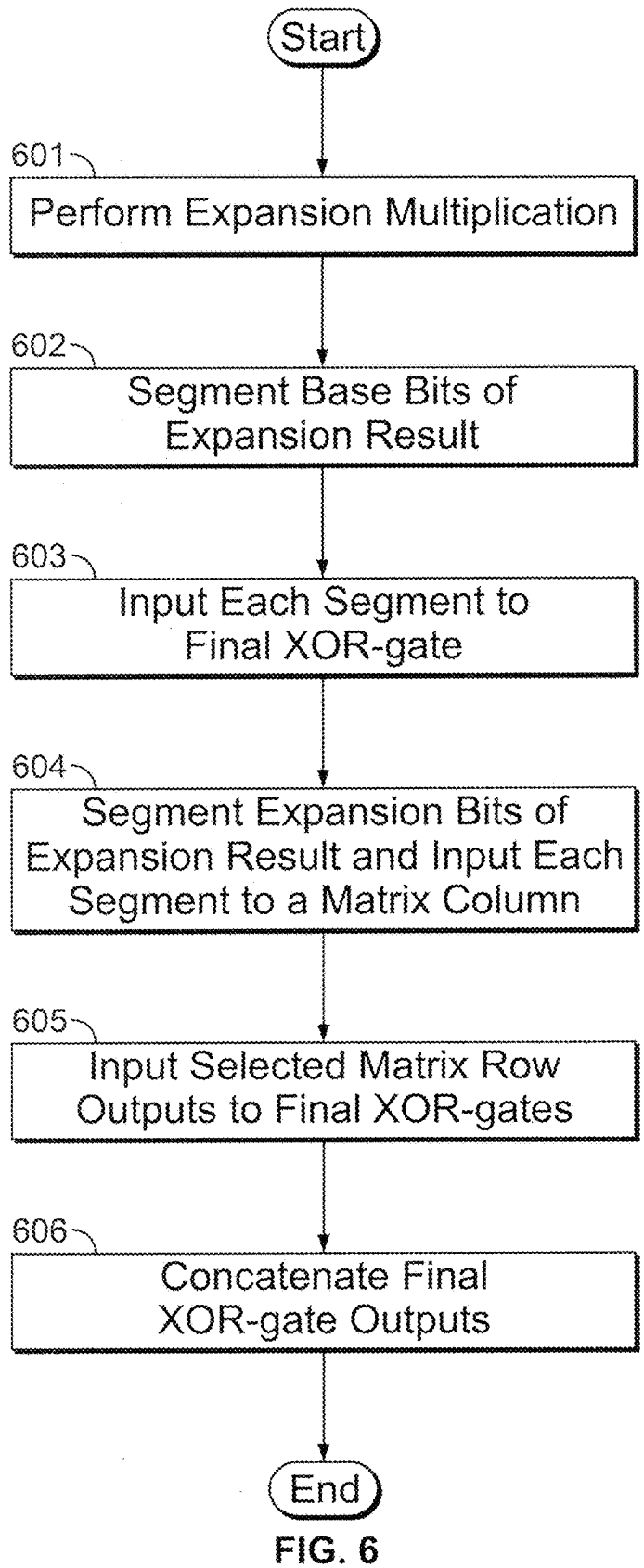
FIG. 6 is a flow diagram of a method according to an embodiment of the present invention for operating a device incorporating the present invention to perform Galois-field reduction.

After the Galois-field reduction circuitry has been configured as above, or for fixed Galois-field reduction circuitry which has been loaded with the m−1 precalculated values (as at 501, 502), the Galois-field circuitry may be operated to reduce a Galois-field expansion as follows (see FIG. 6):

After the expansion has been performed in multiplier 401 (as at 601), then depending on the value of m, the m base bits of the expansion are broken into ranges of, e.g., 32 bits (as at 602), and each range of base bits is input to one of XOR-gates 404, 405, 406, 407, etc. (as at 603). The m−1 expansion bits are similarly broken into ranges and each range is input to a column of matrix 400 (as at 604) and the resulting output of each row 403 is input (as at 605) to its corresponding one of XOR-gates 404, 405, 406, 407, etc. The outputs of as many of XOR-gates 404, 405, 406, 407, etc. as are used are concatenated (as at 606) to provide the reduced result.

In the implementations described so far, a coefficient table, implemented as a register file, has been provided in the specialized processing block (e.g., digital signal processing block) to store the reduction constants. However, the register file has to be altered to provide circuitry to support a choice of operation between a "normal" mode and Galois-field operation mode. For example, although the simplified register file described above has four entries, sixteen entries may actually be required, while many available devices provide only eight-entry register files in their specialized processing blocks.

Additional logic is added to the register file as well. For example, at the physical gate level, the added XOR-gate 208 is actually 18×15=270 XOR-gates. In a specialized processing block having two coefficient tables, that means that 2×270=540 extra XOR-gates are added to the block.

It is further suggested above, in the example of FIG. 4, that a 32-entry register file could be used. In such as case, the number of XOR-gates increases to 32×31=992 XOR-gates in each register file, meaning that 1,984 additional XOR-gates would be included in each specialized processing block if there are two register files per specialized processing block.

Therefore, in accordance with further embodiments of the invention, instead of storing the constants for each out-of-field position and XORing them during operation with the in-field values, the XOR operations are precalculated and stored in the coefficient table, so that additional XOR-gates are not needed. In addition, other embodiments include a carry enable/disable mechanism in the multipliers and adders within the specialized processing block, so that the further multiplication or addition operations need not be performed outside the block (e.g., in programmed general-purpose logic of a programmable device). This allows existing specialized processing blocks to be used, without additional resources, for many Galois-field operations.

Specifically, in the earlier embodiments discussed above, the coefficient table stores the constants of the upper, out-of-field, bits of the multiplication result that are to be XORed with the lower, in-field, bits of the result. The constants are retrieved from the table and the XOR operations are performed. If the XOR result for one of the constants is still out-of-field, then that result is further XORed with the lower bits of the multiplication result.

For example, in the GF(2) field discussed above, using the particular generator polynomial set forth, the constants for the respective ones of the seven out-of-field bits are {29, 58,116,232,205,135,19}. Thus, '29' will be stored in entry 1 of the table, '58' will be stored in entry 2 of the table, '116' will be stored in entry 3 of the table, and so on. Each constant for which the out-field-bit is '1' is XORed in turn with the in-field bits, possibly resulting in additional XOR operations if any XOR result is still out-of-field.

Figure 7:
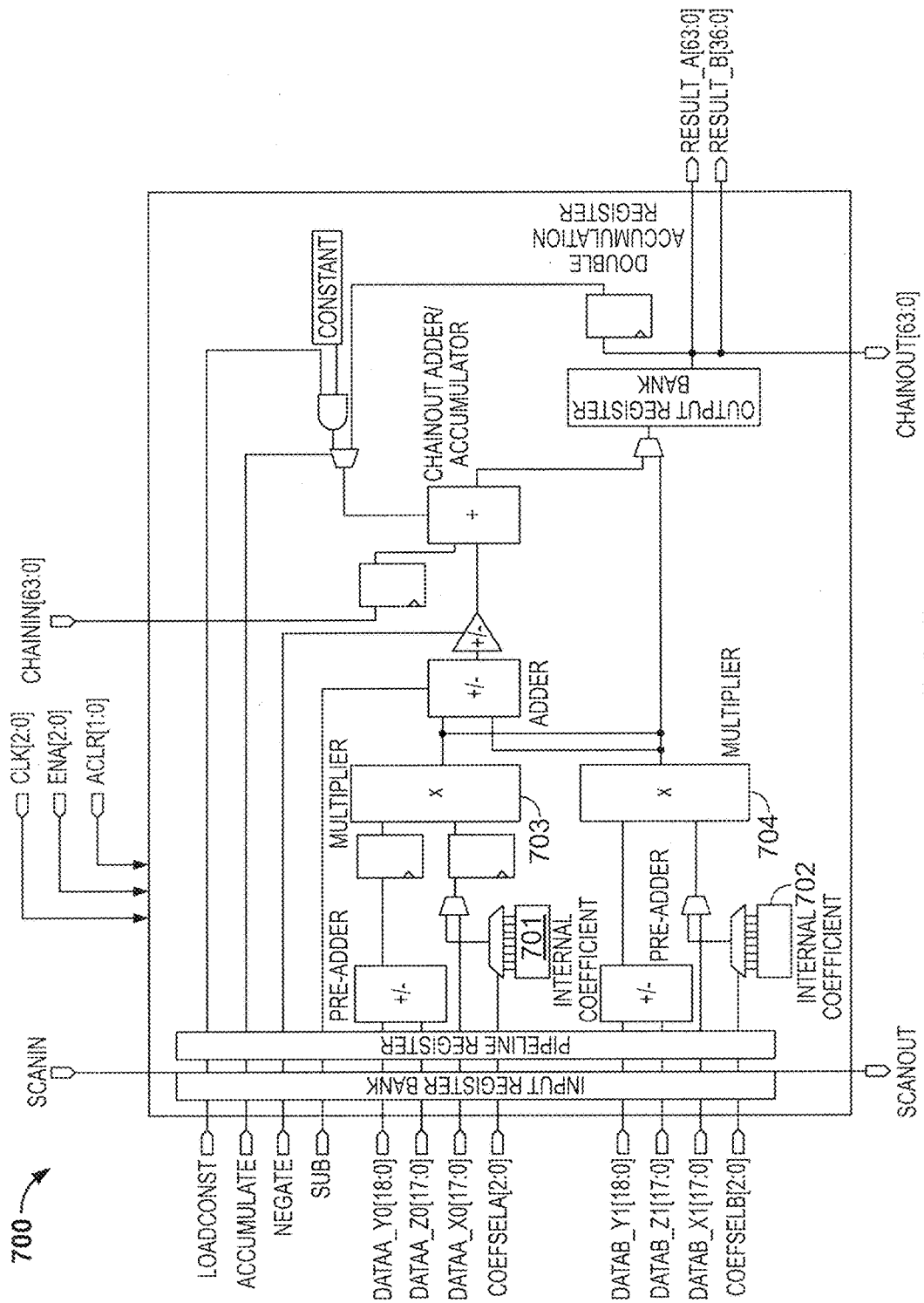
FIG. 7 is a simplified version of the internal structure of a DSP block in a programmable integrated circuit device, incorporating an embodiment of the present invention.

In accordance with the aforementioned further implementations of this invention, rather than store the individual constants for later XOR operations, the XOR values for all combinations of out-of-field bits are determined and stored. A simplified version of the internal structure of a DSP block 700 based on DSP blocks in the STRATIX® and ARRIA® families of FPGAs from Altera Corporation is shown in FIG. 7. As can be seen, there are two coefficient table memories 701, 702 which can be used as inputs to multipliers 703, 704 (discussed below). As noted above, these may be 16-entry coefficient tables. The XOR results of the seven constants referred to above with all combinations of the seven out-of-field bits may be accommodated in these two 16-entry coefficient tables 701, 702, by using one table for four of the seven out-of-field bits (e.g., bits 11:8), and using the other table for three of the seven out-of-field bits (e.g., bits 14:12). The two tables may be loaded as shown in FIG. 8, where "^" denotes an XOR operation. More specific examples will be discussed below in connection with FIG. 10.

Figure 9:
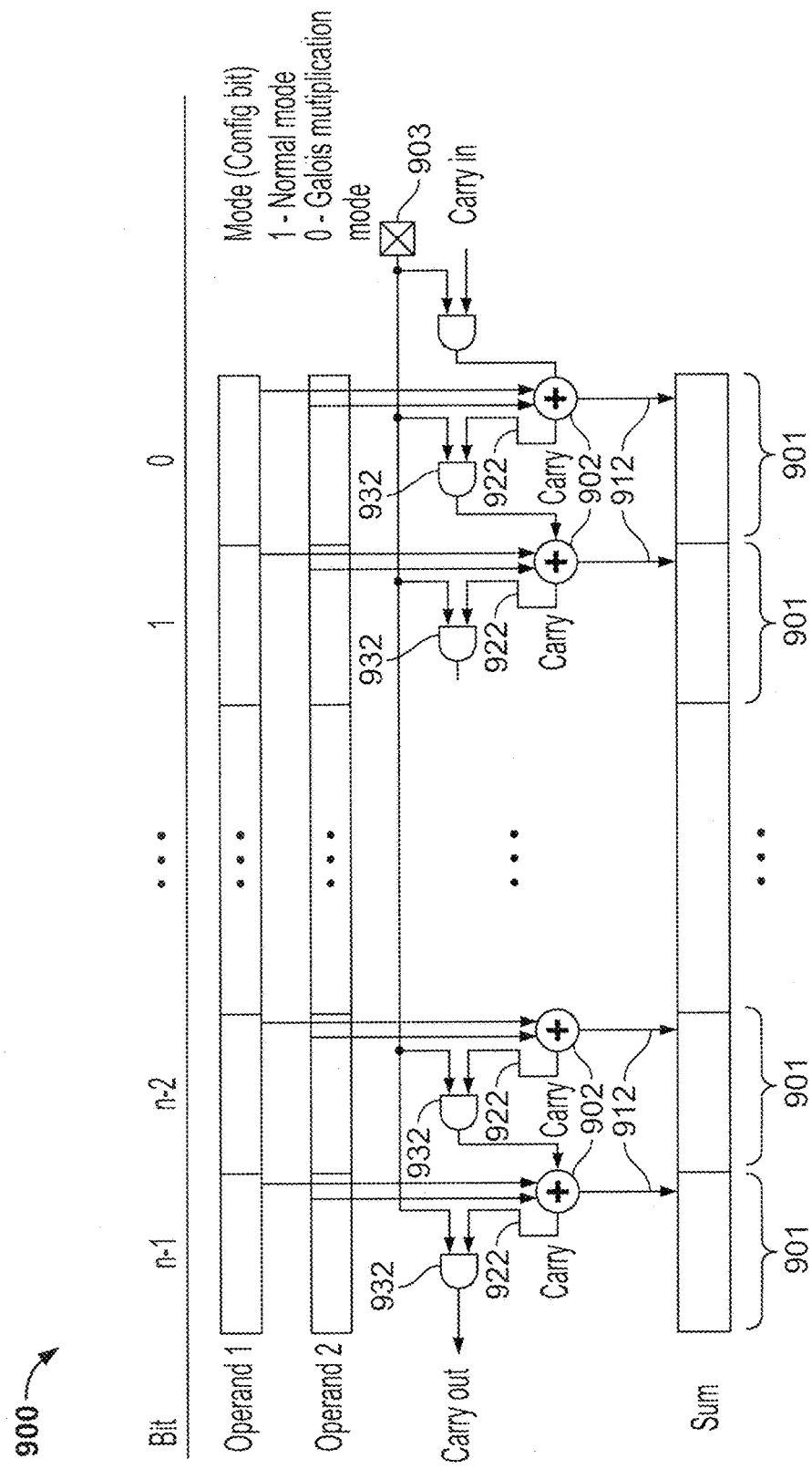
FIG. 9 shows carry-disable circuitry according to an embodiment of the present invention.

As discussed above, in some implementations in programmable devices such as FPGAs, the Galois-field multiplication operation itself is performed in configured general-purpose programmable logic outside the specialized processing block, because Galois-field operations handle carries differently. In accordance with the implementation illustrated in FIG. 9, multipliers 703, 704 may be modified to provide a carry-disable feature that can be activated when performing Galois-filed operations. As seen in FIG. 9, each multiplier 900 includes a final adder 902 for each bit 901.

Each adder 902 outputs a sum output 912 and a carry output 922. In accordance with this implementation, AND-gate 932 is provided for each bit. Each respective carry output 922 is ANDed at a respective AND-gate 932 with a Galois-field configuration bit 903. In "normal" mode, bit 903 is '1' and the carries are output normally. In Galois-field mode, bit 903 is '0' so no carries are output.

Figure 10:
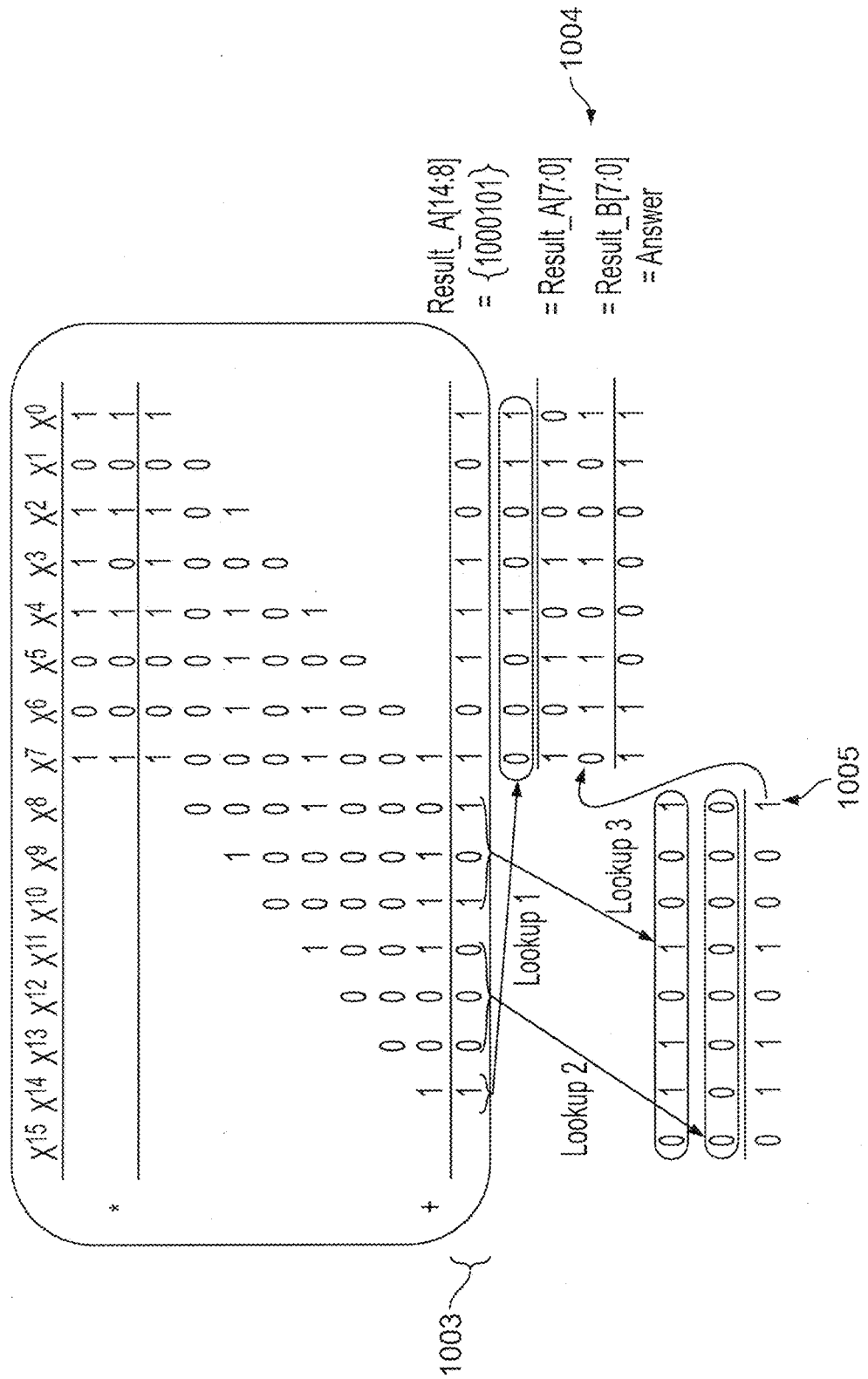
FIG. 10 is a diagram of a multiplication operation performed according to embodiments of the invention.
Figure 11A:
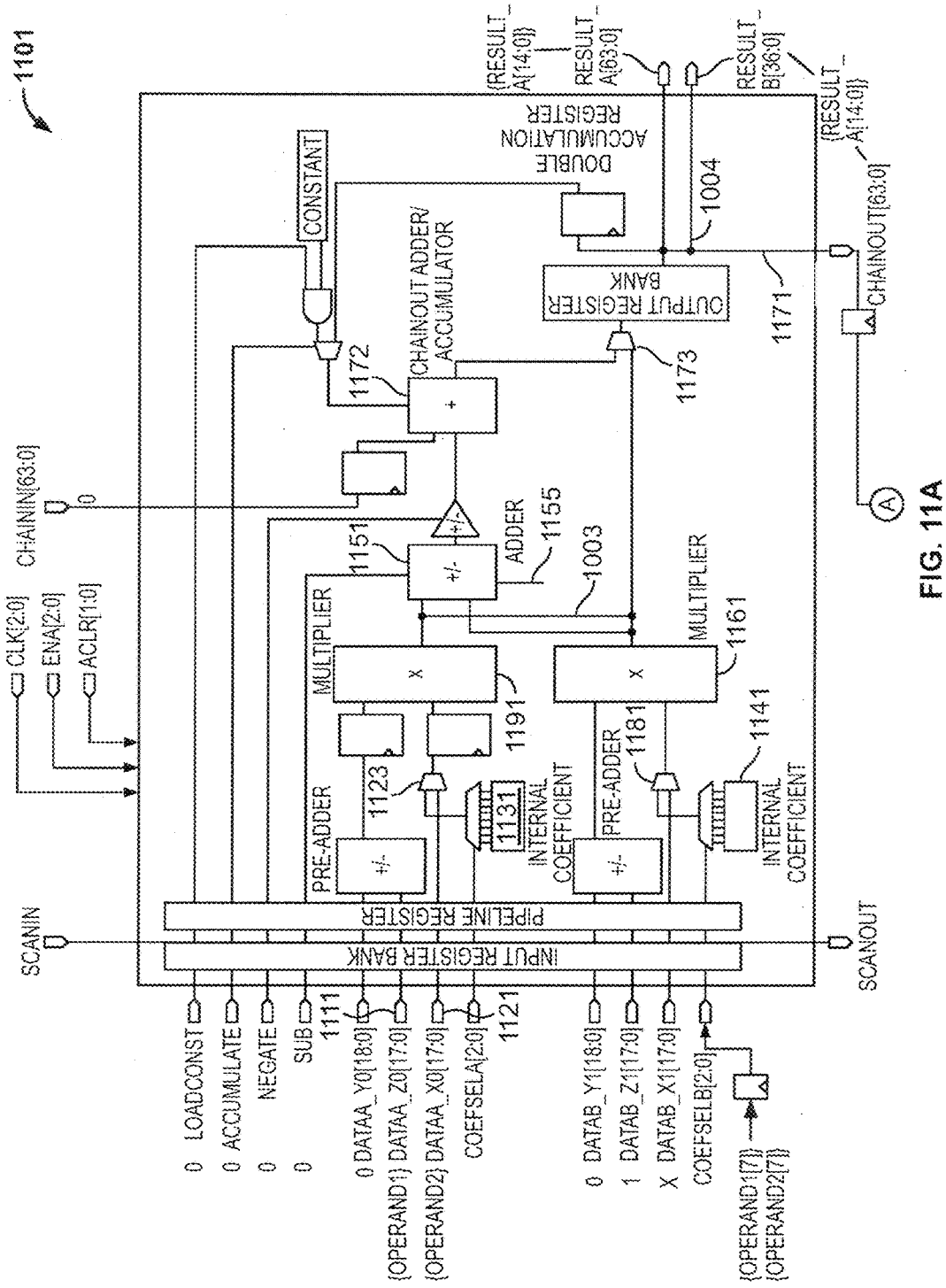
FIGS. 11A and 11B (hereinafter referred to collectively as FIG. 11) show an example of how two digital signal processing blocks may be combined to perform a Galois-field multiplication.
Figure 11B:
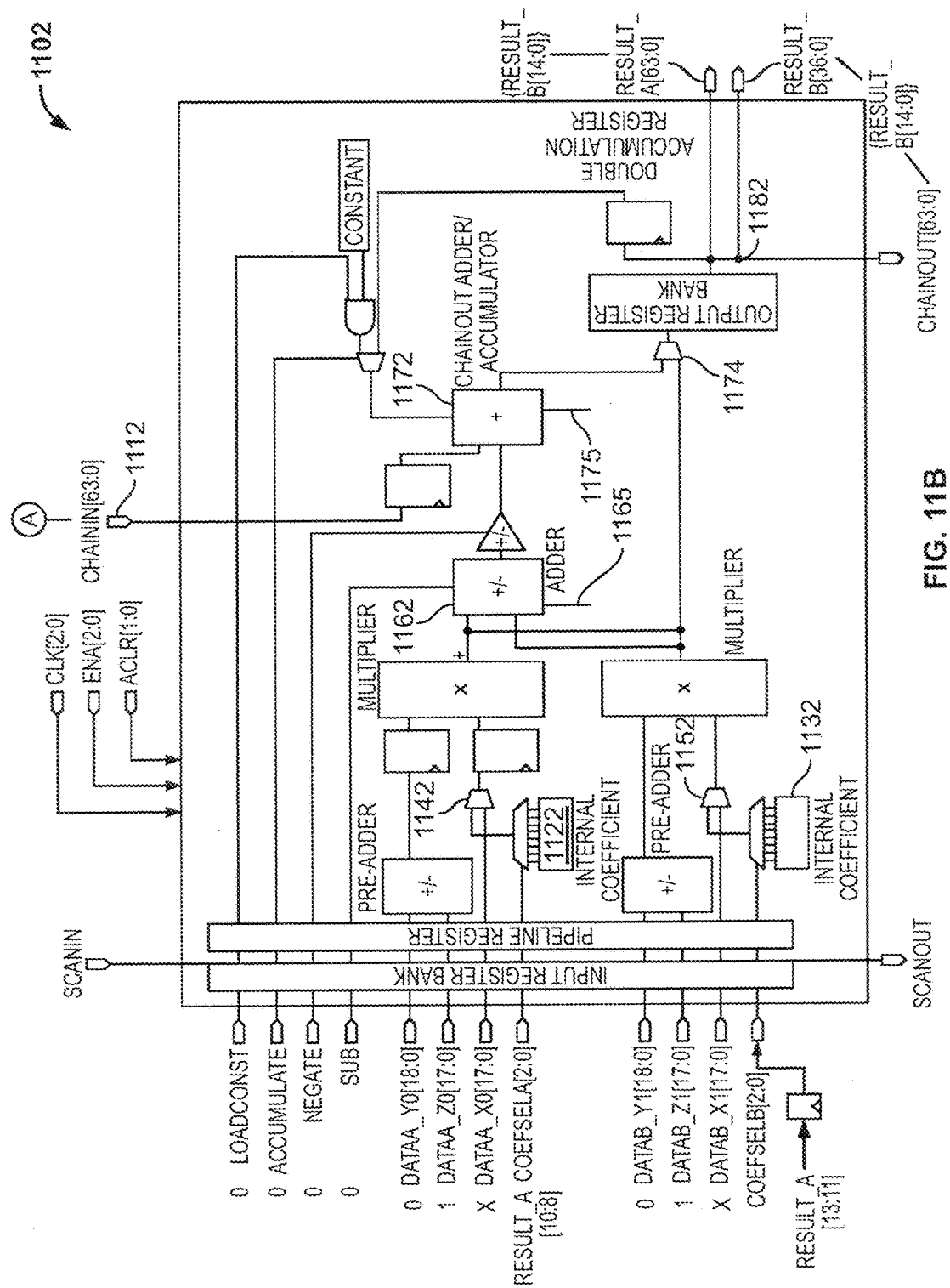

FIGS. 10 and 11 shows an example of how two digital signal processing blocks of the type shown in FIG. 7 may be combined to perform a Galois-field multiplication without using the general-purpose programmable logic of the programmable device. In this example, the two values to be multiplied are $10011101_2$ and $10010101_2$, which are input at 1111 and 1121, respectively. Multiplexer 1123 is configured to select input 1121 rather than coefficient register 1131. The actual multiplication operations in multiplier 1191 are diagrammed in FIG. 10. The in-field bits [7:0] of the result are 101110012, while the out-of-field bits [14:8] of the result are 10001012.

The uppermost out-of-field bit [14] is used as a lookup address for coefficient table 1141 of DSP block 1101, which is selected by configuring multiplexer 1181. Even though the multiplication result normally is needed for this lookup, the uppermost bit of the result can be '1' only when the uppermost bits of both operands 1111, 1121 are '1', so those two bits can be used to select one of two precalculated XOR choices for the uppermost bit. This lookup value is added (XORed) at 1151 (Galois-field mode is activated by applying a '0' to input 1155 as discussed above in connection with FIG. 9) in block 1101 to the output of multiplier 1161 to yield, via adder/accumulator 1172 and multiplexer 1173, the intermediate value 1004 of FIG. 10 (the out-of-field bits, not shown at 1004, are the same as the out-of-field bits of value 1003). The fifteen bits of value 1004 are output at 1171 from block 1101 and input at chain-in input 1112 to block 1102.

Lookup 2 of FIG. 10 is performed using bits [10:8] of result 1003 to address coefficient register 1122 of block 1102, while lookup 3 of FIG. 10 is performed using bits [13:11] of result 1003 to address coefficient register 1132 of block 1102. Coefficient registers 1122, 1132 are selected by configuring multiplexers 1142, 1152. Lookup 2 and lookup 3 are added (XORed) at adder 1162 (Galois-field mode is activated by applying a '0' to input 1165 as discussed above). The derived value 1005 from combining lookup 2 and lookup 3 is added (XORed) at adder 1172 (Galois-field mode is activated by applying a '0' to input 1175 as discussed above in connection with FIG. 9), and the result is output, via multiplexer 1174, at 1182.

This approach of FIGS. 10 and 11 can be used for any size Galois-field calculation, because it does not rely on adding a particular number of XOR-gates to each DSP block, but rather relies on chaining additional DSP blocks, which can be done serially or in parallel. In addition, because the configurable general-purpose logic is not used, but only the relatively more fixed DSP blocks, the operation is faster and timing is more certain. It should be noted however, that this approach does not exclude reliance on the configurable general-purpose logic for a particular user logic design, should the design call for using the configurable general-purpose logic.

Figure 12:
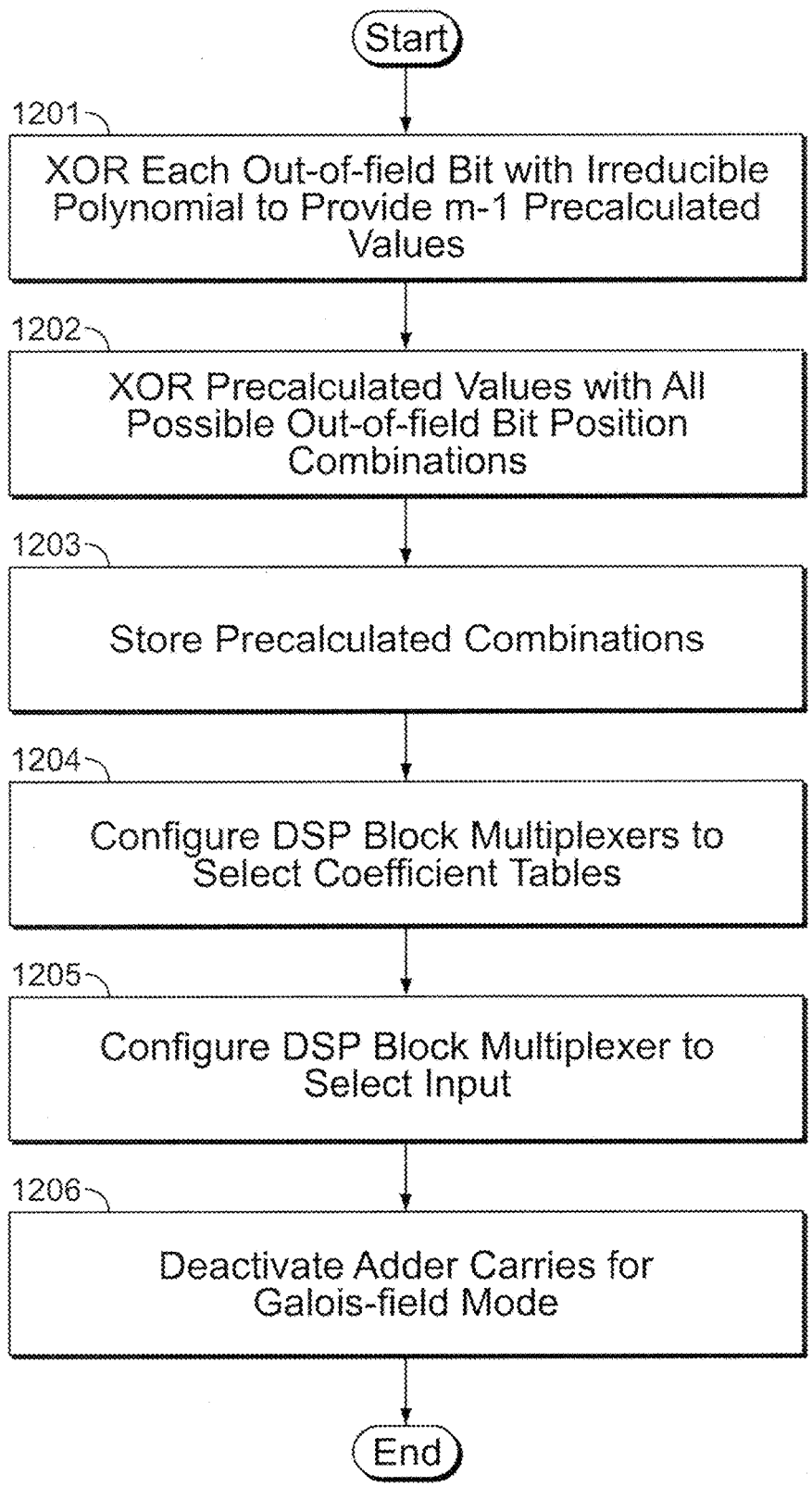
FIG. 12 is a flow diagram of another method according to an embodiment of the present invention for configuring a programmable integrated circuit device incorporating the present invention to perform Galois-field reduction.

A method 1200 according to this approach for configuring a programmable integrated circuit device to perform Galois-field operations is diagrammed in FIG. 12. Once m and the irreducible polynomial are known, the m−1 precalculated values described above may be calculated (as at 1201). Those precalculated values may then be XORed (as at 1202) with all possible combinations of out-of-field bits (see FIG. 8), and stored (as at 1203) in appropriate ones of registers 1141, 1122, 1132 in a suitable number of DSP blocks 1101, 1102. Each DSP block 1101 is configured for Galois-field reduction operation by configuring multiplexers 1181, 1142, 1152 to select coefficient tables 1141, 1122, 1132 (as at 1204), configuring multiplexer 1123 to select input 1121 (as at 1205), and enabling the Galois-field mode of adders 1151, 1162, 1172 (as at 1206) to deactivate their carries.

Figure 13:
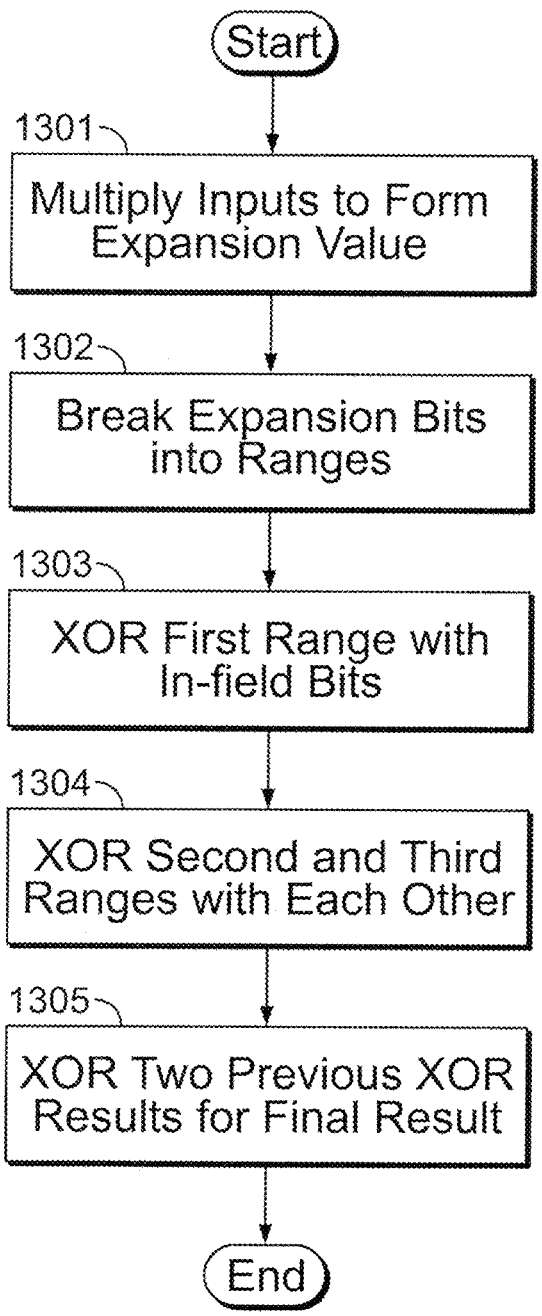
FIG. 13 is a flow diagram of another method according to an embodiment of the present invention for operating a device incorporating the present invention to perform Galois-field reduction.

After the Galois-field reduction circuitry has been configured in that manner), the Galois-field circuitry may be operated to reduce a Galois-field expansion as follows (see FIG. 13):

After the expansion has been performed in multiplier 1191 (as at 1301), then depending on the value of m, the m−1 expansion bits are broken into ranges (as at 1302) of, e.g., one bit, three bits and three bits. The lookup value at 1141 is selected based on the value of the one bit (as at 1303) and XORed with m in-field bits of the multiplication result (as at 1304). The lookup values at 1122, 1132 are selected based on the two three-bit fields (as at 1305) and XORed together (as at 1306). That result is XORed (as at 1307) with the previous XOR result (at 1304) to provide the final result. Depending on the size of the overall operation, several such "final" results may be concatenated (as at 1308) to provide the desired result.

Thus it is seen that Galois-field reduction circuitry, and methods for configuring and operating such circuitry, have been provided.

Figure 14:
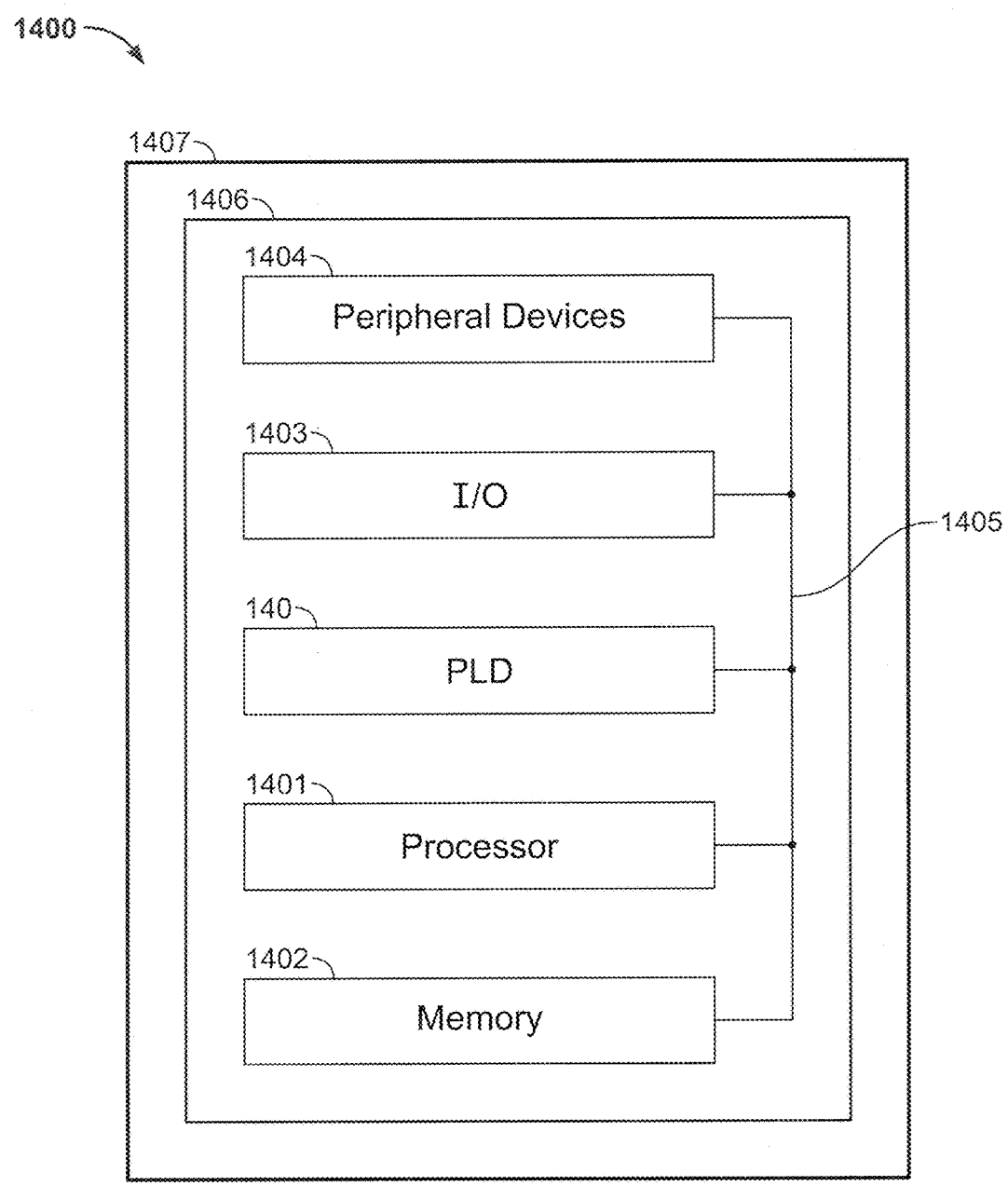
FIG. 14 is a simplified block diagram of an exemplary system employing a programmable logic device incorporating the present invention.

A PLD 140 configured to include Galois-field reduction circuitry according to an implementation of the present invention may be used in many kinds of electronic devices. One possible use is in an exemplary data processing system 1400 shown in FIG. 14. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

System 1400 can be used in a wide variety of applications, such as computer networking, data networking, instrumentation, video processing, digital signal processing, Remote Radio Head (RRH), or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

Figure 15:
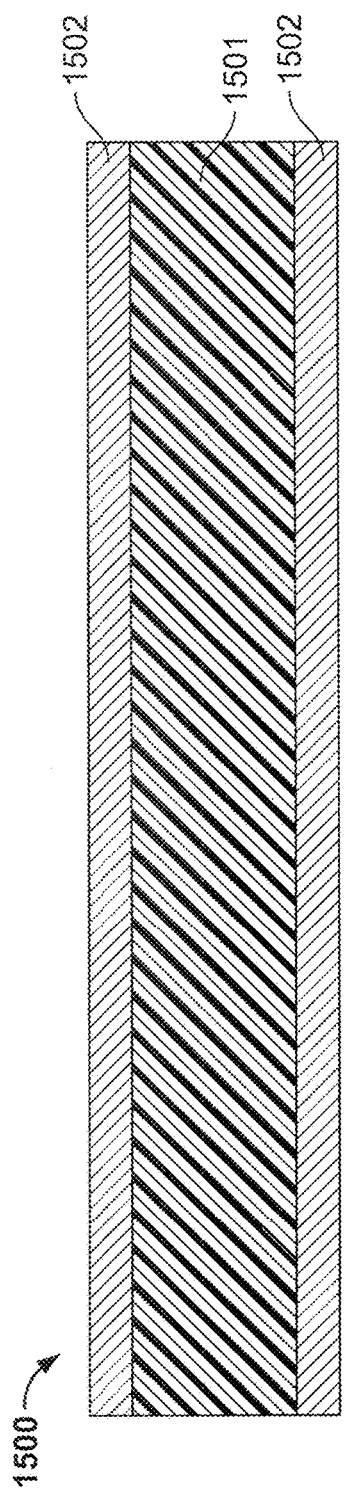
FIG. 15 is a cross-sectional view of a magnetic data storage medium encoded with a set of machine-executable instructions for performing the method according to the present invention for configuring a programmable integrated circuit device to perform Galois-field reduction.

Instructions for carrying out a method according to this invention for programming a programmable device may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools as described above FIG. 15 presents a cross section of a magnetic data storage medium 1500 which can be encoded with a machine executable program that can be carried out by systems such as the aforementioned personal computer, or other computer or similar device. Medium 1500 can be a floppy diskette or hard disk, or magnetic tape, having a suitable substrate 1501, which may be conventional, and a suitable coating 1502, which may be conventional, on one or both sides, containing magnetic domains (not visible) whose polarity or orientation can be altered magnetically. Except in the case where it is magnetic tape, medium 1500 may also have an opening (not shown) for receiving the spindle of a disk drive or other data storage device.

The magnetic domains of coating 1502 of medium 1500 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 16:
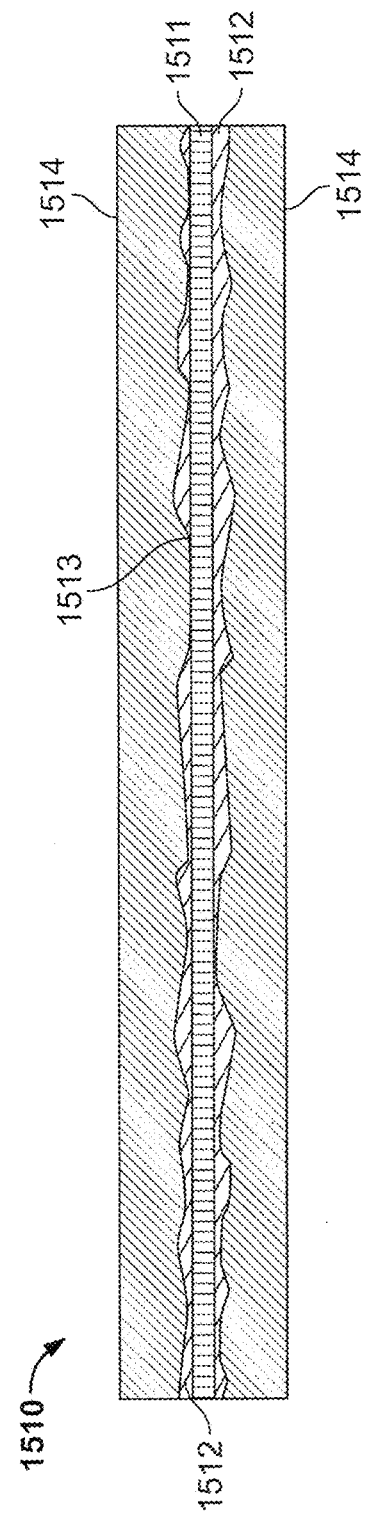
FIG. 16 is a cross-sectional view of an optically readable data storage medium encoded with a set of machine executable instructions for performing the method according to the present invention for configuring a programmable integrated circuit device to perform Galois-field reduction.

FIG. 16 shows a cross section of an optically-readable data storage medium 1510 which also can be encoded with such a machine-executable program, which can be carried out by systems such as the aforementioned personal computer, or other computer or similar device. Medium 1510 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1510 preferably has a suitable substrate 1511, which may be conventional, and a suitable coating 1512, which may be conventional, usually on one or both sides of substrate 1511.

In the case of a CD-based or DVD-based medium, as is well known, coating 1512 is reflective and is impressed with a plurality of pits 1513, arranged on one or more layers, to encode the machine-executable program. The arrangement of pits is read by reflecting laser light off the surface of coating 1512. A protective coating 1514, which preferably is substantially transparent, is provided on top of coating 1512.

In the case of magneto-optical disk, as is well known, coating 1512 has no pits 1513, but has a plurality of magnetic domains whose polarity or orientation can be changed magnetically when heated above a certain temperature, as by a laser (not shown). The orientation of the domains can be read by measuring the polarization of laser light reflected from coating 1512. The arrangement of the domains encodes the program as described above.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Galois-field reduction circuitry for reducing a Galois-field expansion value using an irreducible polynomial, the Galois-field reduction circuitry comprising:

a plurality of memories, each for storing a predetermined value, wherein precalculated in-field values corresponding to predefined Galois-field expansion values having a single '1' in an out-of-field bit are determined based on said irreducible polynomial and said predefined Galois-field expansion values, wherein each of the predetermined values is determined based on one or more of said precalculated in-field values, and wherein out-of-field bits of said expansion value address said plurality of memories to output one or more of said predetermined values; and exclusive-OR circuitry for combining output of said plurality of memories with in-field bits of said expansion value.

2. The Galois-field reduction circuitry of claim 1 wherein:

different ranges of said out-of-field bits address different ones of said plurality of memories to output a plurality of said predetermined values; and said exclusive-OR circuitry comprises:

first exclusive-OR circuitry for combining said plurality of said predetermined values with each other, and second exclusive-OR circuitry for combining output of said first exclusive-OR circuitry with said in-field bits of said expansion value.

3. A method of operating Galois-field reduction circuitry to reduce a Galois-field expansion value using an irreducible polynomial, where the Galois-field reduction circuitry includes a plurality of memories, and exclusive-OR circuitry for combining output of said plurality of memories with in-field bits of said expansion value; said method comprising:

for each predefined Galois-field expansion value having a single '1' in an out-of-field bit, deriving a precalculated in-field value from said predefined Galois-field expansion value and said irreducible polynomial;

for different possible combinations of out-of-field bits, combining ones of said precalculated in-field values to yield combined values;

storing each said combined value in one of said plurality of memories;

using values of said out-of-field bits to address said plurality of memories and select corresponding one or more of said combined values; and operating on said select corresponding one or more of said combined values and said in-field bits to determine a reduced Galois-field value.

4. The method of claim 3 wherein said combining comprises performing an exclusive OR operation.

5. The method of claim 4 wherein said operating comprises performing a further exclusive OR operation.

6. The method of claim 3 wherein said operating comprises performing an exclusive OR operation.

7. The method of claim 3 wherein said deriving said precalculated in-field value from said predefined Galois-field expansion value and said irreducible polynomial comprises performing an exclusive OR operation between said predefined Galois-field expansion value and said irreducible polynomial.

8. The method of claim 3 wherein said using values of said out-of-field bits to address said plurality of memories and select corresponding one or more of said combined values comprises using different ranges of said out-of-field bits to address different ones of said plurality of memories to select a plurality of said combined values.

9. The method of claim 8 wherein said operating comprises:

using a first exclusive OR operation to further combine said plurality of combined values; and using a second exclusive OR operation to combine said further combined plurality of combined values with said in-field bits.

10. The method of claim 9 wherein said operating further comprises using a third exclusive OR operation to combine one of said plurality of combined values with said in-field bits prior to said using said first exclusive OR operation and prior to said using said second exclusive OR operation.

* * * * *